United States Patent
Woodworth et al.

[15] 3,661,347
[45] May 9, 1972

[54] GAIN CHANGER
[72] Inventors: William H. Woodworth; Jack A. Crawford, both of China Lake, Calif.
[73] Assignee: The United States of America as represented by the Secretary of the Navy
[22] Filed: July 16, 1969
[21] Appl. No.: 844,732

[52] U.S. Cl. ..........................244/77 D, 244/75 R, 318/648, 318/651
[51] Int. Cl. ....................................B64c 13/50, B64c 15/00
[58] Field of Search...............244/77 E, 77 G, 77 D; 318/651

[56] References Cited
UNITED STATES PATENTS
3,359,793   12/1967   Kendall et al..........................244/77 G Primary Examiner—Benjamin A. Borchelt
Assistant Examiner—H. A. Birmiel
Attorney—Edgar J. Brower, Roy Miller and Harry I. Jacobs

[57] ABSTRACT

A device for adjusting the gain of the amplifier which drives the control surfaces of an aerodynamic vehicle to compensate for changes in lateral acceleration of the vehicle wherein the acceleration component of the commanded guidance is compared to the measured acceleration normal to the longitudinal axis of the vehicle. If the commanded acceleration is higher than that measured, the gain of the variable gain amplifier which drives the control surfaces of the aerodynamic vehicle is increased.

3 Claims, 3 Drawing Figures

INVENTORS.
WILLIAM H. WOODWORTH
JACK A. CRAWFORD
BY
ATTORNEYS.

1

GAIN CHANGER

GOVERNMENT INTEREST

The invention described herein may be manufactured and used by or for the Government of the United States of America for governmental purposes without the payment of any royalties thereon or therefor.

BACKGROUND OF THE INVENTION

In controlling an aerodynamic body, the amount of force on a control surface necessary to cause lateral acceleration of the vehicle increases as the speed of the vehicle increases. It is desirable to provide for linear control over a substantial range of speeds, thus, a simple fixed gravity term applied to a guidance control unit is unsatisfactory for compensating for the decrease in acceleration of the vehicle as the speed of the vehicle increases.

SUMMARY OF THE INVENTION

In accordance with the present invention, means for measuring the lateral acceleration of an aerodynamic vehicle normal to the longitudinal axis of said vehicle are provided. The electronic signal proportional to that acceleration and the electronic guidance signal are measured and their difference integrated. Variable gain degenerative feedback amplifiers drive the control surfaces of the vehicle and are gain responsive to the pulse width of a sawtooth generator. The pulse width of the sawtooth generator is varied in response to the integrated difference of the measured acceleration and the electronic guidance signal. A level detector, which produces an output whenever the difference of the sawtooth generator output and the integrated difference of the measured acceleration and the electronic guidance signal is positive, pulse width modulates the output of the sawtooth generator. Whenever the level detector produces an output, bi-directional switches ground out the feedback of the variable gain amplifier. Therefore, if the commanded acceleration is higher than that measured, the output voltage of the integrator changes at a rate proportional to the difference between the measured and commanded accelerations thus increasing the gain of the variable gain amplifiers.

DESCRIPTION OF THE PREFERRED EMBODIMENT

Figure 1:
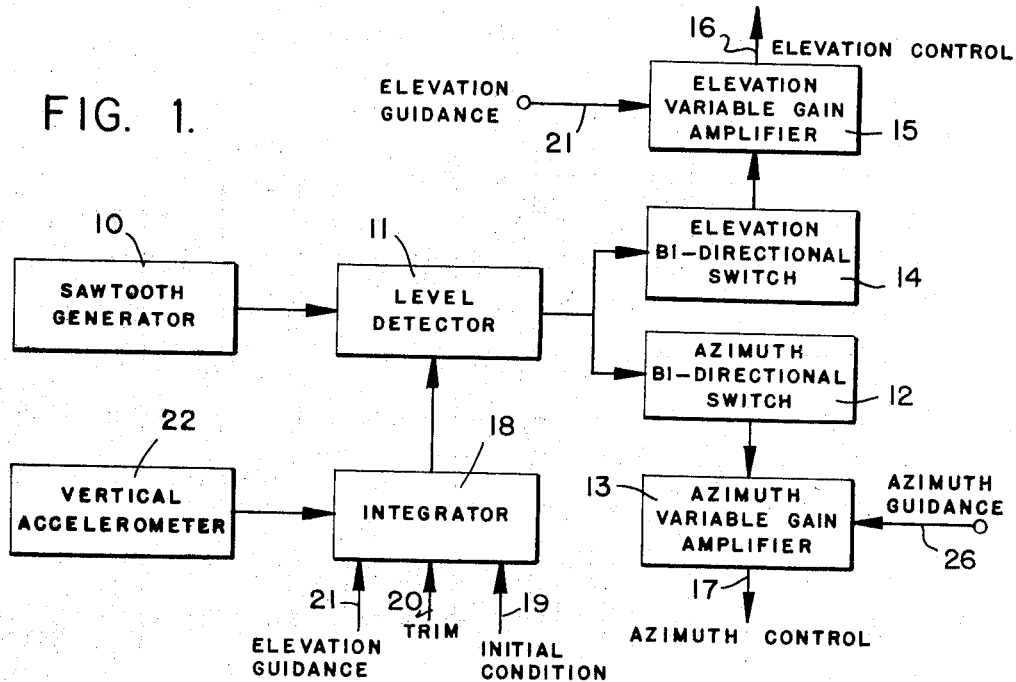
FIG. 1 is a block diagram of a gain changer in accordance with the present invention.

As shown in FIG. 1, an integrator 18 receives vertical acceleration information from vertical accelerometer 22, elevation guidance information 21, and trim guidance information 20. Vertical accelerometer 22 measures the vertical acceleration normal to the longitudinal flight path of an aerodynamic vehicle. Trim guidance component 20 corrects for the constant acceleration of gravity, and initial condition 19 starts integrator 18 at time zero.

In operation, the gain changer receives elevation guidance information 21 and azimuth guidance information 26. Elevation variable gain amplifier 15 drives elevation control 16 which manipulates the control surfaces of the aerodynamic vehicle to change the flight path in the vertical direction. Similarly azimuth guidance control 26 drives azimuth variable gain amplifier 13 which in turn drives azimuth control 17 which manipulates control surfaces to change the flight path of the aerodynamic vehicle in the horizontal direction.

Figure 2:
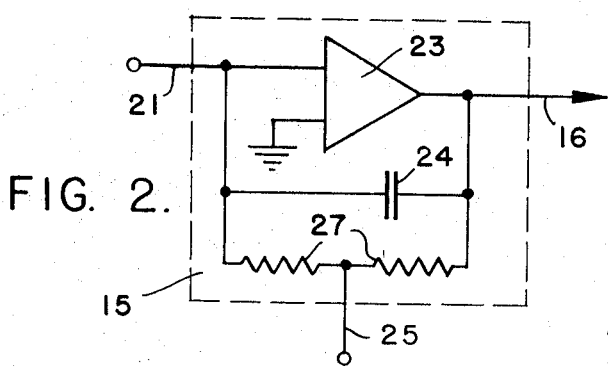
FIG. 2 is a schematic diagram of a variable gain amplifier of the block diagram of FIG. 1.

FIG. 2 is a schematic of elevation variable gain amplifier 15 which comprises, operational amplifier 23 having a feedback network comprising the parallel combination of capacitor 24 and center tapped resistor 27. Center tapped resistor 27 is capable of being grounded at point 25. Azimuth variable gain amplifier 13 is identical to elevation variable gain amplifier 15.

Figure 3:
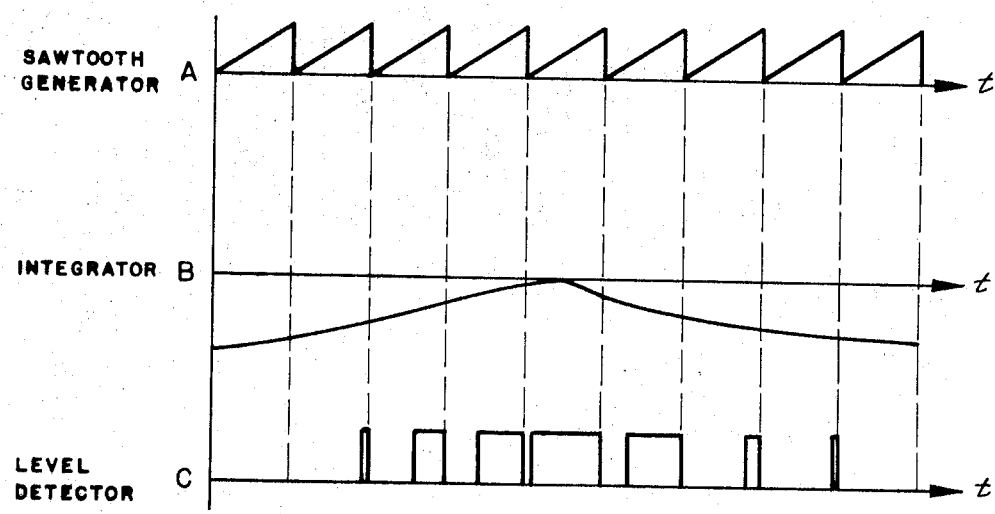
FIG. 3 illustrates various wave-forms at various points in the block diagram of FIG. 1.

Sawtooth generator 10 generates a sawtooth wave-form as shown in FIG. 3A. Level detector 11 sums the output of integrator 18 and the output from the sawtooth generator. Integrator 18 sums information coming from vertical accelerometer 22, elevation guidance signal 21 and trim 20 to produce an output voltage proportional to the time integral of the difference between the commanded acceleration from elevation guidance signal 21 and the measured acceleration from vertical accelerometer 22. This output is a slowly changing DC voltage as shown in FIG. 3B. Level detector 11 sums the signals from sawtooth generator 10 and integrator 11 to obtain their difference. Whenever this difference is positive the level detector outputs a predetermined direct current voltage as shown in FIG. 3C.

The output of level detector 11 drives bi-directional switches 14 and 12. Whenever level detector 11 produces a positive output, elevation bi-directional switch 14 grounds out center tap point 25 of elevation variable gain amplifier 15. This ground out increases the effective gain of amplifier 15. Whenever elevation bi-directional switch 14 is not commanded to ground out point 25, the gain of elevation variable gain amplifier 15 is minimum. By grounding out point 25 in response to the output of level detector 11, the effective average gain of amplifier 15 is controlled. Capacitor 24 smooths the grounding effect so that the effective average gain increases as the pulse width of the output of level detector 11 increases.

In effect, what is happening is that the elevation variable gain amplifier is gain responsive to the pulse width of level detector 11.

Level detector 11 controls azimuth bi-directional switch 12. Thus, whenever level detector 11 produces an output, bi-directional switch 12 grounds out the center tap resistor on azimuth variable gain amplifier 13. Thus, the average gain of azimuth variable gain amplifier 13 is controlled by the output from level detector 11. Tests have shown that both azimuth and elevation amplifiers should have their gain increased as the vertical acceleration increases.

In accordance with this invention the gain of both elevation variable amplifier 15 and azimuth variable gain amplifier 13 is controlled by a single level detector responsive to a vertical accelerometer responsive to changes in vertical acceleration normal to the longitudinal axis of an aerodynamic vehicle.

What is claimed is:

1. A device for adjusting the gain of the amplifier which drives the control surfaces of an aerodynamic vehicle to compensate for changes in lateral acceleration of the vehicle comprising:

means for measuring the acceleration of said vehicle normal to the longitudinal axis of said vehicle and producing an electronic signal proportional to said acceleration;

means for producing an electronic guidance signal for said vehicle;

means for summing the electronic signal proportional to said acceleration and the electronic guidance signal to obtain their difference, and to integrate said difference;

an oscillator;

a variable gain amplifier driven by said electronic guidance signal having gain responsive to the pulse width of said oscillator;

said amplifier driving a control surface of the vehicle; and means for varying the pulse width of said oscillator in response to the integrated difference of the electronic signal proportional to said acceleration and the electronic guidance signal; so that the gain of said amplifier controlling the path of said vehicle varies in response to said measured acceleration.

2. The device as set forth in claim 1 wherein:

the oscillator is a sawtooth generator;

the variable gain amplifier includes a feedback circuit comprising the parallel combination of a capacitor and a center-tapped resistor; and the means for varying the pulse width of said sawtooth generator comprises:

means for summing the output of said integrator and the output of said sawtooth generator to obtain their difference, a level detector producing a constant output whenever said difference of the sawtooth generator and integrator outputs is positive, and a bi-directional switch grounding the center-tap of said feedback resistor of the variable gain amplifier whenever the level detector produces an output, so that the average gain of the variable gain amplifier varies in response to the measured acceleration.

3. The device as set forth in claim 2 wherein:

said amplifier drives a first control surface for controlling the path of the vehicle along a first axis in response to said guidance signal;

said bi-directional switch operates upon said amplifier in response to said level detector;

a second guidance signal is generated for controlling the path of the vehicle along a second axis;

a second amplifier drives a second control surface for controlling the path of the vehicle along said second axis in response to said second guidance signal; and a second bi-directional switch operates upon said second amplifier in response to said level detector.

* * * * *